United States Patent
Staniec et al.

(10) Patent No.: US 9,288,520 B2
(45) Date of Patent: Mar. 15, 2016

(54) TECHNIQUE FOR PROVIDING ON A PROGRAM CHANNEL COMPOSITE PROGRAMMING CONTENT ATTRIBUTED TO DIFFERENT SOURCES

(71) Applicant: Time Warner Cable Enterprises LLC, New York, NY (US)

(72) Inventors: Thomas J. Staniec, Fayetteville, NY (US); Robert Harris, Venice, FL (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 0 days.

(21) Appl. No.: 14/283,054

(22) Filed: May 20, 2014

(65) Prior Publication Data

US 2014/0337906 A1 Nov. 13, 2014

Related U.S. Application Data (63) Continuation of application No. 11/079,958, filed on Mar. 15, 2005, now Pat. No. 8,730,985.

(51) Int. Cl.

| | |
|---|---|
| H04L 12/28 | (2006.01) |
| H04N 21/2665 | (2011.01) |
| H04H 20/10 | (2008.01) |
| H04H 20/12 | (2008.01) |
| H04H 60/04 | (2008.01) |
| H04L 12/18 | (2006.01) |
| H04L 29/06 | (2006.01) |
| H04N 7/16 | (2011.01) |

(Continued)

(52) U.S. Cl.
CPC ......... *H04N 21/2665* (2013.01); *H04H 20/103* (2013.01); *H04H 20/12* (2013.01); *H04H 60/04* (2013.01); *H04L 12/18* (2013.01); *H04L 29/06027* (2013.01); *H04L 45/16* (2013.01); *H04L 65/4076* (2013.01); *H04N 7/16* (2013.01); *H04N 21/2221* (2013.01); *H04N 21/6405* (2013.01); *H04N 21/64322* (2013.01); *H04N 21/854* (2013.01); *H04L 12/28* (2013.01)

(58) Field of Classification Search
USPC ....................................... 725/35, 36
See application file for complete search history.

(56) References Cited

U.S. PATENT DOCUMENTS

| | | |
|---|---|---|
| 5,508,733 A | 4/1996 | Kassatly |
| 5,986,692 A | 11/1999 | Logan et al. |

(Continued)

FOREIGN PATENT DOCUMENTS

| | | |
|---|---|---|
| WO | WO0069163 | 11/2000 |

OTHER PUBLICATIONS

VBrick MPEG Video Solutions, VBrick systems, inc. www.VBriek. com Builiding Vision Across your Network. R 11/02, 8 pages.
IP Multicast Dimitrios Pendarakis EE 6761 Computer Communication Networks Lecture 9. 17 pages. no date.
TANDBERG Solutions. The TANDBERG Solution for Video, www.ivci.com, 8 pages, Rev. 1.2 Jul. 2003.
VBrick Systems. Inc. Case Study-WebFN, Building Vision Across your Network re Transporting Financial News Video-Webeasts, R 5/01, 2 pages, www.vbrick.com.
IP Multicast and Firewalls Memo, .COPYRGT. The Internet Society (1999). http://www.live.com/mcastfw.html, 8 pages.
Internet Protocol (IP) Multicast Technology Overview. .COPYRGT. 2000 Cisco Systems. Inc., 15 pages, www.cisco.com.

(Continued)

*Primary Examiner* — Duc C Ho
(74) *Attorney, Agent, or Firm* — Gazdzinski & Associates, PC (57) ABSTRACT

In providing composite programming content from different sources on a program channel, a host processor joins IP multicast groups for which "live" contents from multiple sources are provided. Specifically, the host processor collects packets containing the live contents based on their destination addresses associated with the IP multicast groups. Segments of the received live contents are selected to realize the composite programming content, which is provided on the program channel.

17 Claims, 4 Drawing Sheets

(51) Int. Cl.
*H04N 21/222* (2011.01)
*H04N 21/6405* (2011.01)
*H04N 21/643* (2011.01)
*H04N 21/854* (2011.01)
*H04L 12/761* (2013.01)

(56) References Cited

U.S. PATENT DOCUMENTS

| | | | |
|---|---|---|---|
| 6,133,910 | A | 10/2000 | Stinebruner |
| 6,473,858 | B1 | 10/2002 | Shimomura et al. |
| 6,493,876 | B1 | 12/2002 | DeFreese et al. |
| 6,769,127 | B1 | 7/2004 | Bonomi |
| 6,771,644 | B1 | 8/2004 | Brassil et al. |
| 6,792,618 | B1 | 9/2004 | Bendinelli et al. |
| 6,972,786 | B1 | 12/2005 | Ludwig |
| 7,012,891 | B1 | 3/2006 | Chandran et al. |
| 7,017,120 | B2 | 3/2006 | Shnier |
| 7,028,264 | B2 | 4/2006 | Santoro et al. |
| 7,055,166 | B1 | 5/2006 | Logan et al. |
| 7,075,919 | B1 | 7/2006 | Wendt et al. |
| 7,096,489 | B2 | 8/2006 | Kitsukawa et al. |
| 7,146,632 | B2 | 12/2006 | Miller |
| 7,174,126 | B2 | 2/2007 | McElhatten et al. |
| 7,202,915 | B2 | 4/2007 | Desch |
| 7,222,354 | B1 | 5/2007 | Ching et al. |
| 7,230,639 | B2 | 6/2007 | Ferren et al. |
| 7,296,091 | B1 | 11/2007 | Dutta et al. |
| 7,325,043 | B1 | 1/2008 | Rosenberg et al. |
| 7,330,638 | B2 | 2/2008 | Ostrover |
| 7,609,668 | B1 | 10/2009 | Smith |
| 7,707,300 | B1 | 4/2010 | Champagne |
| 2002/0048275 | A1 | 4/2002 | Atwater et al. |
| 2002/0067730 | A1 | 6/2002 | Hinderks et al. |
| 2003/0105808 | A1 | 6/2003 | Lee |
| 2003/0217365 | A1 | 11/2003 | Caputo |
| 2003/0231629 | A1* | 12/2003 | Banerjee et al. ............ 370/390 |
| 2004/0233907 | A1 | 11/2004 | Hundscheidt et al. |
| 2005/0193410 | A1 | 9/2005 | Eldering |
| 2005/0201406 | A1* | 9/2005 | Sekine et al. ............... 370/432 |
| 2006/0018335 | A1 | 1/2006 | Koch et al. |
| 2006/0168104 | A1 | 7/2006 | Shimizu et al. |
| 2007/0169148 | A1* | 7/2007 | Oddo et al. ..................... 725/46 |

OTHER PUBLICATIONS

Confersery IVCi's Streaming Video Solution Technical White Paper. IntelliNet, .COPYRGT. 2003, IVCi, inc., 11 pages.
Netscape Search. Interoperability Rules for Multicast Routing Protocols Memo. D. Thaler, Microsoft Oct. 1999, 1 page.
Netscape Search, IP Multicast. no date. I page.
Netscape Search, Mbone. no date, 2 pages.
Netscape Search, Internet Broadcast, Multicast Glossary of Terms (A-F), (M-R). no date. 2 pages.
NetworkWorldFusion, IP Multicast still waiting for takeoff article, By Jason Meserve, Network World, Jan. 10, 2000, 3 pages.
Chapter 43. Internet Protocol Multicast. Internetworking Technologies Handbook, 43-1 to 43-16, no date, 1-58705-001-3.
SCTE's Conference on Emerging Technologies 2004. The All Digital Network—Imagine the Possibilities, by Thomas J. Staniec, V.P. Network Operations and Engineering, Time Warner Cable Broadband, et Jan. 13-15, 2004 Dallas, 56 pages.
A Tutorial on IP Multicast, 3 pages, no date http://ntrg.cs.ted.ie/undergrad/4ba2/multicast/antony/.
IP Multicast API, .COPYRGT. Philippe Dax-1995, 1996, 5 pages, http://www.infres.enst.fr/.about.dax/polys/multicast/api.sub--en.html.
Border Gateway Multicast Protocol. Jon Crowcroft, Dec. 3, 1998, 4 pages, http://www.cs.ucl.ac.uk/staff/jon/mmbook/book/node80.html.
EE122: Multicast, Oct. 22, 2003 (last modified Oct. 27, 2003), Today's Lecture: 16. 9 pages, no date.
Multicast over TCP/IP HOWTO: Introduction, Multicast Explained, Kernel Requirements and Configuration. The MBone. Multicast Applications, Multicast Programming, http://www.tldp.org/HOETO/Multicast-HOWTO. 16 pages.
A Brief Overview of IP Multicast. no date, 5 pages, http://www.onet.on.ca/uninet/reference/multicast-overview.html.

\* cited by examiner

TECHNIQUE FOR PROVIDING ON A PROGRAM CHANNEL COMPOSITE PROGRAMMING CONTENT ATTRIBUTED TO DIFFERENT SOURCES

PRIORITY

This application is a continuation of and claims priority to co-owned and co-pending U.S. patent application Ser. No. 11/079,958 filed Mar. 15, 2005 of the same title, issuing as U.S. Pat. No. 8,730,985 on May 20, 2014, which is incorporated herein by reference in its entirety.

FIELD OF THE INVENTION

The invention relates to communications systems and methods, and more particularly to a system and method for providing on a program channel programming contents received from different sources through a communications network, e.g., a cable TV network.

BACKGROUND OF THE INVENTION

Internet protocol (IP) multicast technology has emerged to meet the needs of distributing in real time audio and video to a set of hosts joining, e.g., a videoconference in a corporate environment. The IP multicast technology efficiently utilizes the limited bandwidth of an IP network by simultaneously delivering a single stream of audio/video data to the set of hosts connected to the network. The audio/video data is routed in the network in the form of IP packets or datagrams, which are replicated by routers in distributing them through the network, thereby requiring the source to second only one copy of the data to the network.

IP multicast operates based on a group concept. A group of hosts which expresses an interest in receiving a particular data stream can join the conference using a well known Internet Group Management Protocol (IGMP). The group does not have any physical or geographical boundaries. That is, the hosts in the group can be located anywhere on the IP 30 network.

All hosts which have joined the conference are aware of the IP multicast packets with a particular destination address to which the source sends the data stream. When the packets traverse the network, the hosts read them based on their destination address, which is a so called "Class D address." Specifically, each IP packet whose destination address starts with "1110" is an IP multicast packet. The remaining 28 bits of the address identify the multicast group for which the packet is intended.

A host, especially a so-called "level 2 host," may act as a source sending multicast traffic and/or a receiver receiving multicast traffic. A receiver host including the IGMP implementation in "their TCP/IP stack, is capable of joining and leaving multicast groups and propagating this information to multicast routers.

When a host joins a particular multicast group, it informs its processor to read and deliver any IP multicast packets in the network interface having the bit sequence identifying the group in their destination field. When the host is no longer interested in the particular group, it informs the processor that it wants to leave that group.

The IGMP is used to dynamically register individual hosts in a multicast group on a particular network. Hosts identify group memberships by sending IGMP messages to their local multicast router. Under the IGMP, routers listen to IGMP messages and periodically send out queries to discover which groups are active or inactive on a particular subnet.

SUMMARY OF THE INVENTION

The proliferation of Internet-related technologies, including the above-described IP multicast technology, by no means eclipses the importance of "content" for which these technologies were developed. After all, people enjoy the underlying content (e.g., news, literary works, artistic performances, movies, messages, etc.) that such technologies help deliver to their TV sets, personal computers (PCs), digital video recorders (DVRs), wireless telephones, personal digital assistants (PDAs), etc.

Cable TV is a well known source of content, and a cable operator traditionally transmits the content over multiple program channels to TV sets via set-top terminals on subscribers' premises. These program channels may, be specialized, e.g., in news, music, weather, sports, cartoons, etc. A cable operator has an incentive to keep programming content on the channels constantly interesting to maintain and grow the subscribership. However, for example, a prior art news channel may focus on local news, whose content is limited to the happenings in a local area, and soon becomes "old" news after it is played repeatedly to fill airtime. Although the local news may be supplemented with news reports from other cities in an attempt to make it more interesting, because of limited resources, the prior art news channel oftentimes still runs recycled news which likely bores people, who in this information age always look forward to receiving fresh and breaking news.

The invention overcomes the prior art limitations by providing on a program channel composite programming content including selected contents of a similar type from different sources, e.g., other broadcasts which have geographic coverages different than the program channel.

In accordance with the invention, to realize one such composite program channel, a processor joins as a member of at least one group (e.g., an IP multicast group) for receiving programming content from at least one source. Such a group is associated with an identifier (e.g., a destination address associated with the IP multicast group). The processor receives information objects (e.g., IP packets) containing programming content from the source, which are identified by the identifier. After the programming content is derived from the information objects, at least part of the programming content is integrated into the broadcast content on the composite program channel. In accordance with an aspect of the invention, the above-described processor may also be used to provide desired broadcast content through a communications network to a user device. The desired broadcast may be selected by a user at the user device from a list of broadcasts which have geographic coverages outside the location of the user device. The processor joins as a member of a group for receiving information objects containing programming content of the selected broadcast, which are identified by an identifier associated with the group. The programming content in the information objects is then provided to the user device based on an address of the device through the communications network In another aspect, a content distribution system is disclosed. In one embodiment, the system includes: (i) a processing apparatus configured to cause at least one programming content associated to a first group of devices to be added to content of a broadcast, the addition being simultaneous with the broadcast thereof to a second group of devices, the first group being identified via an identifier; (ii) an interface configured to receive information elements from at least one source, the information elements being identified by the identifier associated with the first group, the at least one programming content being derived from the information objects; and (iii) a device configured to integrate at least part of the programming content into the broadcast content while the broadcast is presented to one or more viewers.

In a third aspect, a method of providing composite programming content from multiple content sources is disclosed. In one embodiment, the method includes: (i) joining a multicast group for which content elements from the multiple content sources are provided, at least a portion of the content elements comprising content elements relating to a live program; (ii) collecting packets containing the live program based at least in part on destination addresses of the packets being associated with the multicast group; and (iii) delivering on at least one program channel the composite program content comprising the at least portion of the live program and other programming content not associated to the multicast group.

In a fourth aspect, an apparatus configured to broadcast composite programming content to one or more client devices is disclosed. In one embodiment, the apparatus includes: (i) first apparatus configured to provide first programming content, the first programming content comprising content generated at a first geographic location and broadcast to a first group of subscribers proximate the first geographic location; (ii) second apparatus configured to provide second programming content, the second programming content comprising content generated at a second geographic location and broadcast to a second group of subscribers proximate the second geographic location, the second apparatus comprising: processing logic configured to join as a member of the second group of subscribers, the group being identified by an Internet Protocol (IP) multicast group address; and an interface configured to receive information objects containing second programming content from the second location, the second programming content derived at least in part from the information objects, and the information objects being identified by the IP multicast group address; and (iii) a transport multiplexer configured to automatically create a composite of the first and the second programming content for broadcast to the client device.

BRIEF DESCRIPTION OF THE DRAWING

Further objects, features and advantages of the invention will become apparent from the following detailed description taken in conjunction with the accompanying drawings showing illustrative embodiments of the invention, in which.

DETAILED DESCRIPTION

The recent industry focus on, and rapid advancement. in, multimedia and Internet-related technologies by no means eclipse the importance of "content" for which these technologies were developed. The saying "Content is king" has much veracity since, after all, people enjoy the underlying content (e.g., news, literary works, artistic performances, movies, messages, etc.) that such technologies help deliver to their TV sets, personal computers (PCs), digital video recorders (DVRs), wireless telephones, personal digital assistants (PDAs), etc.

Cable TV is a well known source of content, and a cable operator traditionally transmits the content over multiple program channels to TV sets via set-top terminals on subscribers' premises. These program channels may be specialized, e.g., in news, music, weather, sports, cartoons, etc. A cable operator has an incentive to keep programming content on the channels constantly interesting to maintain and grow the subscribership. However, for example, a prior art news channel may focus on local news, whose content is limited to the happenings in a local area, and soon becomes "old" news after it is played repeatedly to fill airtime. Although the local news may be supplemented with news reports from other cities in an attempt to make it more interesting, because of limited resources, the prior art news channel oftentimes still runs recycled news which likely bores people, who in this information age always look forward to receiving fresh and breaking news.

The invention is conducive to providing fresh, interesting content efficiently and premised upon the recognition that content may come from any location with access to a network via wired, wireless, fiber optic and/or other connectivity. In accordance with the invention, for example, a provider of news content for a news channel may monitor and-select to transmit not only local news content, but also interesting news content being broadcast on other news channels having other geographic coverages. By pooling sources of local news content, a news channel can report composite news on events which may have just happened anywhere, subject to the selection by a controller for the composite news channel. An object of the invention is to effectively utilize the existing resources for providing "in-progress" (or "live") content from sources distributed in different areas.

Figure 1:
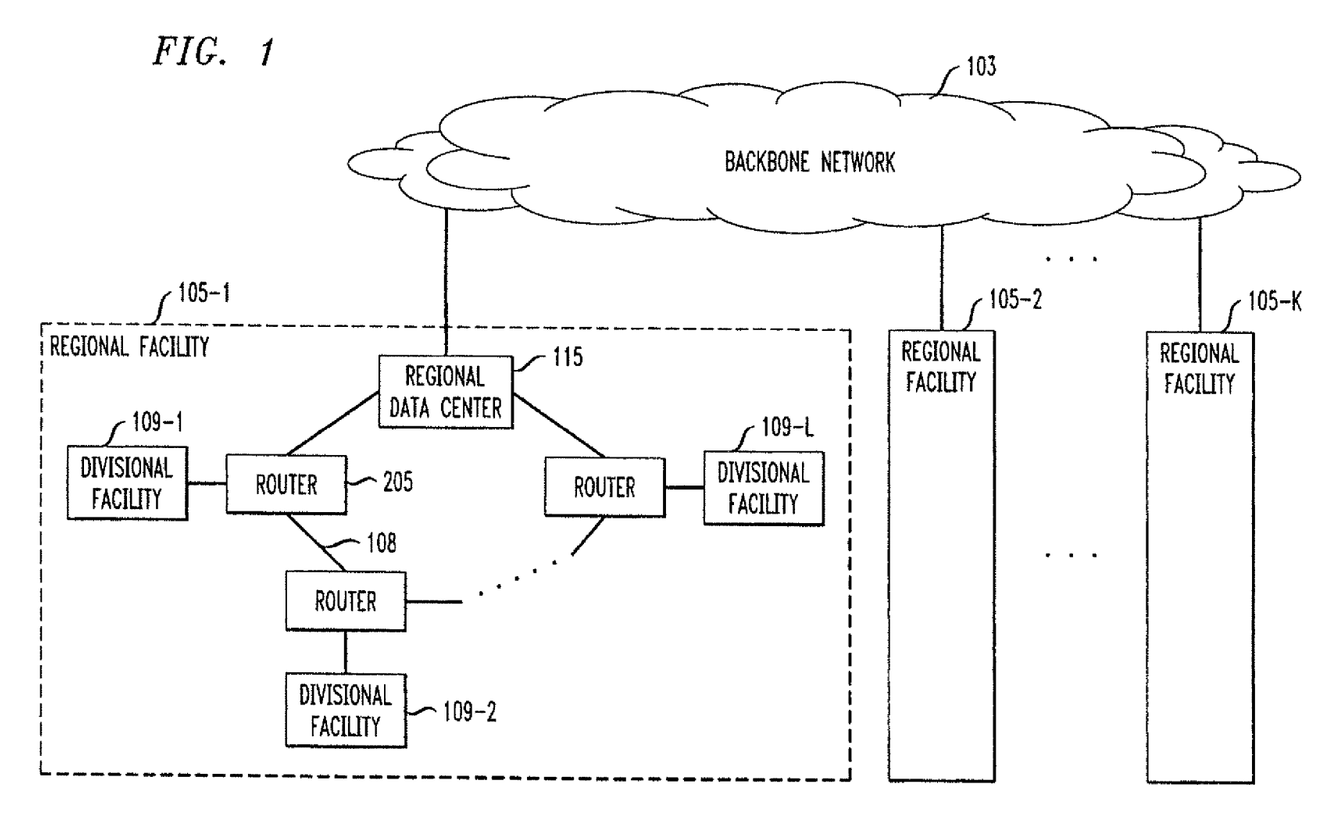
FIG. 1 is a block diagram of a broadband communications system in accordance with the invention.

For example, the invention takes advantage of the current configuration and underutilized capacity of a broadband communications system of a cable operator to realize "composite" program channels. FIG. 1 illustrates broadband communications system 100 embodying the principles of the invention. As in prior art, system 100 includes regional facilities 105-1 through 105-K which are interconnected with backbone network 103, where K represents an integer. Each regional facility, e.g., 105-1, comprises divisional facilities, e.g., 109-1 through 109-L, which are connected with one another in a ring configuration, where L represents another integer. In another embodiment, the divisional facilities may be connected with one another in a mesh configuration. By way of example, backbone network 103 spans nationally, interconnecting regional facilities located in different regions, e.g., different states. In this illustrative embodiment, regional facility 105-1 is located in New York State, comprising regional data center 115, and divisional facilities 109-1 through 109-L distributed, e.g., in different cities in New York State. Regional data center 115 in a conventional manner facilitates communications between divisional facilities in a regional facility but also to and from other regional 15 facilities. For example, divisional facility 109-1 may be located in New York City (NYC); divisional facility 109-2 may be located in Albany, N.Y.; divisional facility 109-3 may be located in Rochester, N.Y.; etc. Similarly, regional facility 105-2 may be located in Florida State, comprising divisional facilities distributed in different cites in Florida.

In this embodiment, the physical layer connecting divisional facilities, say, facilities 109-1 through 109-L, is optical fibers. For example, by employing a well known dense wavelength division multiplexed (DWDM) technique, thirty-two optical carriers having different wavelengths may be multiplexed onto an optical fiber. Each optical carrier can carry information up to about 10 Gb/s. In addition, the divisional facilities interconnected in a ring configuration may form a network (denoted 108), e.g., a wide area network (WAN). The information may be communicated between the networked divisional facilities in packets, in accordance with an Internet protocol (IP).

Figure 2:
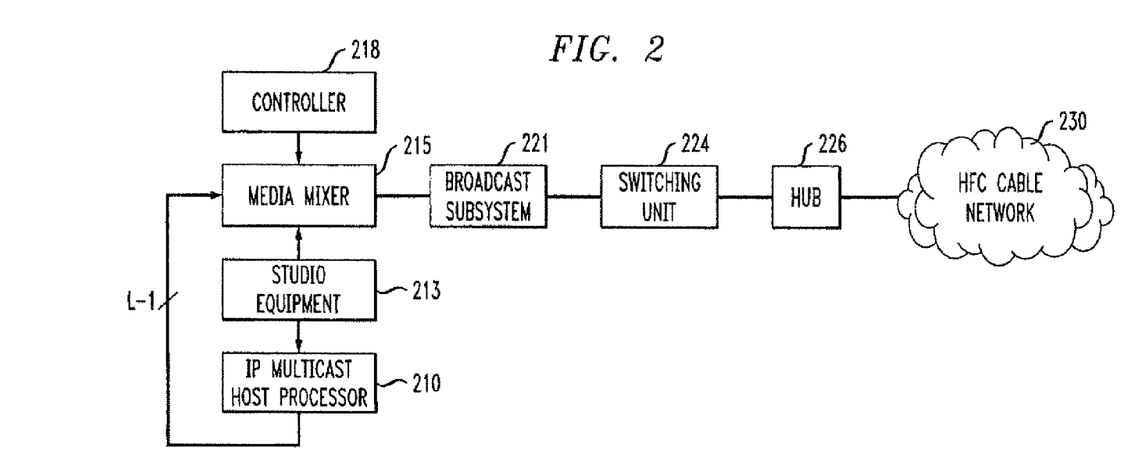
FIG. 2 is a block diagram of a divisional facility in the communications system of FIG. 1.

FIG. 2 illustrates a generic divisional facility in accordance with the invention, representative of anyone of the aforementioned divisional facilities, say, divisional facility 109-1 for example. Divisional facility 109-1 is connected to other divisional facilities through router 205. To realize a composite program channel, e.g., a composite news channel, in accordance with the invention, IP multicast host processor 210 is employed in this particular embodiment to implement IP multicast to collect programming content 10 from other sources, e.g., divisional facilities 109-2 through 109-L. Processor 210 may also send IP multicast traffic containing its own contribution of local programming content to other divisional facilities.

In accordance with an IP multicast technique, processor 210, acting as a source host, delivering to network 108 (or beyond network 108 through backbone network 103) a stream of audio/video data representing news content attributed to NYC where facility 109-1 is located. Such a data stream is generated by studio equipment 213 in a well known manner, which represents studio quality audio/video. Studio equipment 213 may include, e.g., a conventional camera for shooting a live newscast, video/audio coder, etc. The studio quality video/audio data stream is fed to media mixer 215 for processing in a manner described below. At the same time, a copy of the studio quality data stream is also fed to IP multicast host processor 210. The latter packetizes the received data stream into IP packets or datagrams, including a destination address which may start with "1110," which indicates that they are IP multicast packets. The remaining 28 bits of the destination address, whose values are preselected here, identify the multicast "group" for which the packets are intended. The resulting packets are replicated by routers, including router 205, in distributing them through network 108. Hosts, e.g., IP multicast host processors in other divisional facilities, which express an interest in receiving the IP multicast packets can join the multicast group pursuant to a well known Internet Group Management Protocol (IGMP), and can then listen to the packets having the preselected destination address to which the source host (e.g., processor 210 in this instance) sends the packets.

Hosts identify group memberships by sending IGMP messages to their local router. Under the IGMP, the routers listen to IGMP messages and periodically send out queries to discover which groups are active or inactive on a particular network.

In this instance, processor 210 acts not only as a source host sending multicast traffic containing NYC news content, but also a receiver host receiving multicast traffic containing news content sent by other source hosts, e.g., in divisional facilities 109-2 through 109-L. As a receiver host, processor 210, which includes the JUMP implementation in its TCP/IP stack, is capable of joining (and leaving) different multicast groups to receive news contents sent by the source hosts in the respective divisional facilities. After processor 210 joins a multicast group, it reads the IP packets having a destination address preselected for the multicast group, which contain news content contributed by the corresponding divisional facility.

Figure 3:
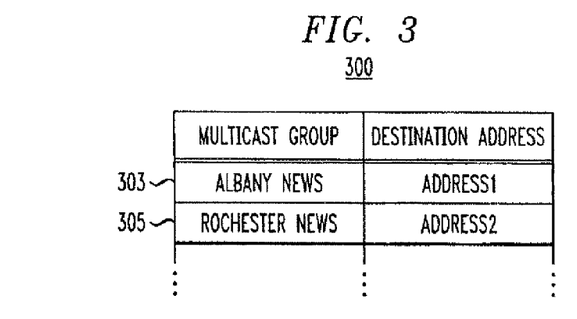
FIG. 3 illustrates a table enumerating multicast groups and the associated destination addresses of packets containing programming contents intended for the respective groups.

FIG. 3 illustrates group address table 300 stored in processor 210 to which processor 210 may refer to receive desirable IP packets for the respective multicast groups which processor 210 may join. In this instance, processor 210 joins the multicast groups to receive Albany, Rochester . . . news contents sent by the IP multicast host processors in divisional facilities 109-2. 109-3, . . . respectively. Referring to row 303 of table 300, processor 210 collects IP packets having "Address1" as their destination address to receive Albany news content being broadcast by divisional facility 109-2; referring to row 305, processor 210 collects IP packets having "Address2 11 as their destination address to receive Rochester news content being broadcast by divisional facility 109-3; and so on and so forth. After receiving the IP packets associated with the different multicast groups, processor 210 extracts therefrom the news contents attributed to the respective locales (i.e., Albany, Rochester . . . ) and generates L-1 video/audio data streams containing the local news contents, respectively. These data streams, representing studio quality audio/video, are fed to media mixer 215.

Thus, media mixer 215 receives from studio equipment 213 the aforementioned video/audio data stream containing in-progress NYC news content, and also from processor 210 the L-1 video/audio data streams containing in-progress "Outside NYCII news contents. To facilitate selecting content from the NYC news and Outside NYC live news feeds to realize the composite news channel, a director at controller 218 is provided, e.g., with an array of monitors connected to mixer 215 for playing thereon the news feeds, respectively.

Figure 4:
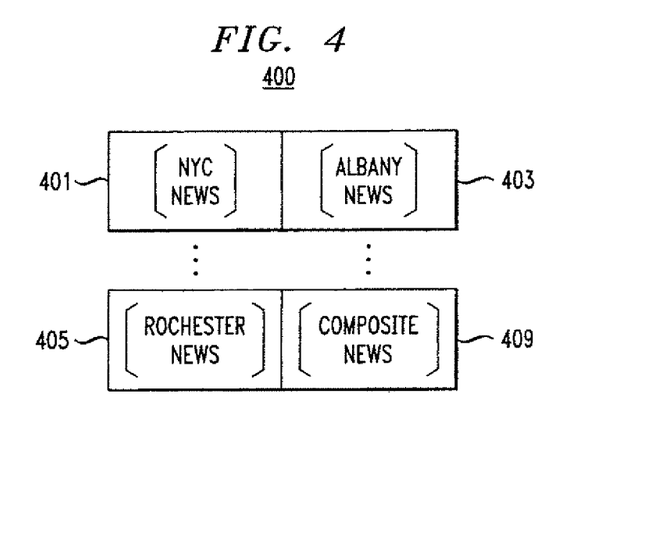
FIG. 4 illustrates monitors for displaying programming contents derived from the packets.

FIG. 4 illustrates the array of monitors, denoted 400, wherein monitor 401 plays the NYC news feed from studio equipment 213. For the Outside NYC news feeds from processor 210, monitor 403 plays the Albany news feed; monitor 405 plays the Rochester news feed; etc. The director may operate controller 218 to cause media mixer 215 to perform real-time cuing of the various live news feeds (as opposed to off-line splicing news footages) to assemble interesting news segments therefrom. The output of mixer 215 comprises a video/audio data stream containing the resulting, composite news content, which is shown on monitor 409.

Mixer 215 feeds the composite news data stream to broadcast subsystem 221. The latter in a conventional manner processes the received data stream, resulting in an MPEG-2 encoded transport stream containing the composite news content. The transport stream is provided to switching unit 224, which switches it to an appropriate modulator in hub 226. The modulator modulates the transport stream onto a carrier having a preselected carrier frequency to broadcast the composite news content through an access network which may comprise wired, wireless, fiber optic and/or other connectivity. Illustratively, the access network comprises hybrid fiber coaxial (HFC) cable network 230 in this instance. Users at set-top terminals may tune to the preselected carrier frequency to receive the composite news content on the news channel associated therewith.

Another object of the invention, is to take advantage of the arrangement of system 100 to provide out-of-market programming on an on-demand basis. This aspect of the invention is premised upon the ideology that content, which can come from anywhere, should be able to follow a user anywhere, and the recognition that an IP multicast group does not have any physical or geographical boundaries, which is essential to realize such an ideology. For example, a Rochester resident comes to visit NYC, who may be more interested in Rochester new~concerning his/her hometown than news about NYC where he/she is currently staying. However, it is typical that news channels in NYC broadcast primarily NYC news, with most certainly little or no Rochester news barring any unusual event occurring in Rochester.

Figure 5:
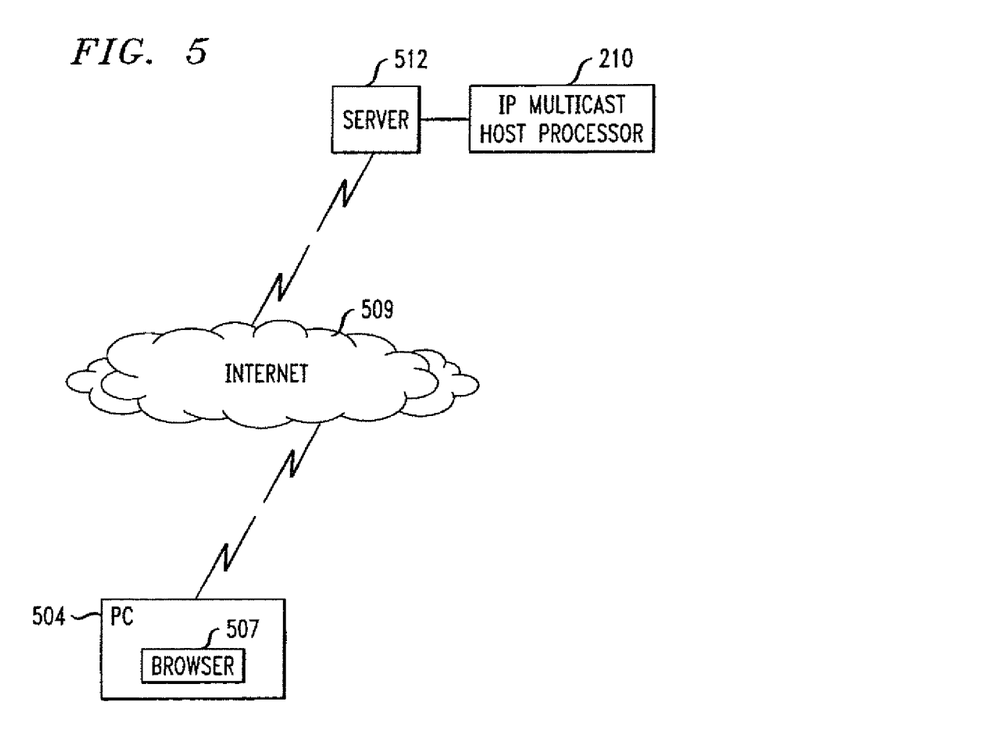
FIG. 5 illustrates an arrangement whereby a user can remotely access selected programming content.

Nevertheless, in accordance with an aspect of the invention, the Rochester resident may access the Rochester news as being broadcast on a Rochester news channel by connecting to an IP multicast host processor, which is a member of an IP multicast group receiving Rochester news content. To that end, in an illustrative embodiment of the invention, the Rochester resident at a user video/audio device, e.g., personal computer (PC) 504 in FIG. 5, establishes an IP connection, e.g., through the Internet 509, to server 512 at a predetermined uniform resource locator (URL). Server 512 in this instance is connected to IP multicast host processor 210. Running browser 507 thereon, PC 504 receives a menu page (denoted 603 in FIG. 6) from server 512, whereon selectable options of receiving broadcasts for various local areas are presented. In particular, option 607 for receiving Rochester news broadcast is presented under the news category.

Continuing the example, the Rochester resident in) this instance selects option 607. Server 512 receives from browser 504 the Rochester news broadcast selection, along with an IP address identifying PC 504 ("the device IP address"). The selection and device IP address information is passed onto processor 210. Based on the selection information, processor 210 looks up in group address table 300 the IP multicast group destination address (e.g., Address2) for receiving Rochester news content, as indicated at step 703 in FIG. 7. Processor 210 at step 706 determines whether it has joined the IP multicast group receiving Rochester news content. If so, processor 210 at step 709 duplicates the IP packets it received which have the group destination address, i.e., Address2, therein. Processor 210 at step 712 replaces the group destination address in the copy of the IP packets with the device IP address identifying PC 504. At step 715, processor 210 forwards the 5 resulting IP packets to server 512. The latter transmits the packets to the Internet 509, through which they are routed to PC 504 based on the device IP address therein. Browser 504 then extracts the news content in the received packets and audiovisually presents the Rochester news as being broadcast, on the Rochester new channel.

Figure 7:
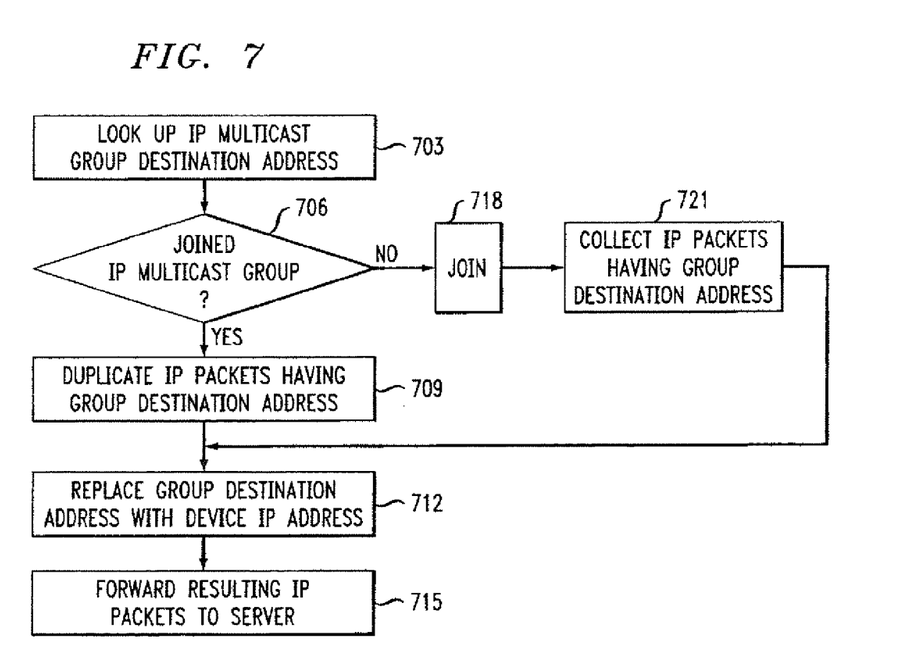
FIG. 7 is a flowchart depicting a process for providing selected programming content to the user in the arrangement of FIG. 5.

Otherwise, if it is determined at step 706 that processor 210 has not joined the IP multicast group receiving Rochester news content. Processor 210 at step 718 joins the multicast group in question. At step 721, processor 210 collects those IP packets having the group destination address, i.e., Address2, therein. The subject routine then proceeds to step 712 where processor 210 replaces the group destination address in the IP packets with the device IP address identifying PC 504. The foregoing merely illustrates the principles of the invention. It will thus be appreciated that those skilled in the art will be able to devise numerous other arrangements which embody the principles of the invention and are thus within its spirit and scope.

Figure 6:
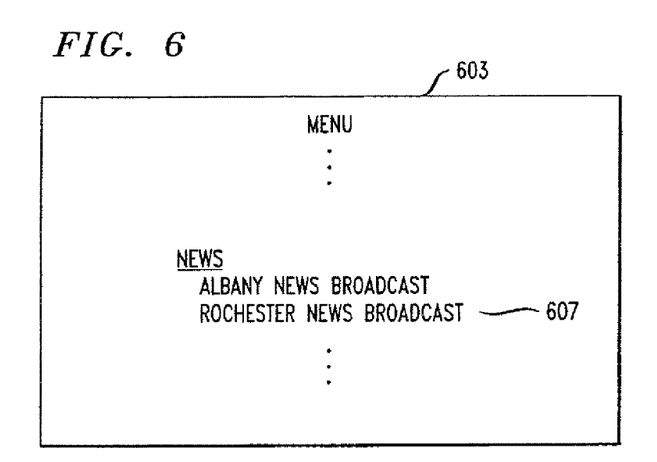
FIG. 6 illustrates a menu page from which specified programming content may be selected for viewing.

For example, in another embodiment, the user may select more than one option on menu page 603 to receive multiple broadcasts. In that embodiment, browser 507 may present the broadcasts visually in a split screen format analogous to monitor array 400 described before, from which 30 the user may select to view one of the multiple broadcasts one at a time. Further, instead of replacing the group destination address in the IP multicast packets with the device IP address as indicated at step 712 in FIG. 7, processor 210 adds the device IP address to the packets to preserve the group destination address for browser 504 to distinguish one broadcast from another.

In addition, it should be emphasized that receiver host processors receiving IP multicast information from a source host processor do not need to be in the same regional facility as illustrated here for convenience. In fact, the receiver host processors and source host processor may be distributed anywhere in regional facilities 105-1 through 105-K, in accordance with the well known IP multicast group concept, where a group is unlimited by any physical or geographical boundaries.

Finally, system 100 and divisional facility 109-1 are disclosed herein in a form in which various functions are performed by discrete functional blocks. However, any one or more of these functions could equally well be embodied in an arrangement in which the functions of anyone or more of those blocks or indeed, all of the functions thereof, are realized, for example, by one or more appropriately programmed processors.

What is claimed is:

1. A content distribution system, said system comprising:
 a processing apparatus configured to cause at least one programming content configured for delivery specifically to a first group of devices to be added to content of a broadcast, said addition being simultaneous with said broadcast thereof to a second group of devices, said second group of devices not being within said first group to which said at least one programming content is specifically configured for delivery, said first group being identified via an identifier;
 an interface configured to receive information elements from at least one source, said information elements being identified by said identifier associated with said first group, said at least one programming content being derived from said information elements; and
 a device configured to integrate at least part of said programming content configured for delivery specifically to said first group of devices into said broadcast content while said broadcast is presented to one or more of said second group of devices.

2. The system of claim 1, wherein said first group comprises an Internet Protocol (IP) multicast group having a plurality of devices, said identifier comprises a destination address associated with said IP multicast group, and said information elements comprise IP packets, said at least one source providing a single copy of said at least one programming content for said plurality of devices in said IP multicast group.

3. The system of claim 1, wherein said at least one programming content comprises content broadcast to an area outside a geographic coverage area of said second group of devices which receive said content of said broadcast.

4. The system of claim 1, wherein said processing apparatus is configured to cause said at least one programming content to be added to said content of said broadcast automatically and without substantial intervention from any devices among said second group of devices.

5. The system of claim 1, further comprising a broadband communications system, wherein said content of said broadcast comprises news content.

6. A method of providing composite programming content from multiple content sources, said method comprising:

joining a multicast group for which content elements from said multiple content sources are provided, at least a portion of said content elements comprising content elements relating to a live program;

collecting packets containing said live program based at least in part on destination addresses of the packets being associated with said multicast group; and delivering on at least one program channel said composite program content comprising said at least portion of said live program and other programming content not associated to said multicast group.

7. The method of claim 6, wherein said packets comprise IP packets.

8. The method of claim 7, further comprising:
replacing said destination addresses associated with said multicast group with a device address; and
forwarding said packets to said device address;
wherein said device address is associated with a computerized device of a user of a cable network.

9. The method of claim 6, wherein said delivery comprises delivery over at least a portion of a hybrid fiber coax (HFC) network to one or more set-top terminals.

10. The method of claim 6, wherein said collection of said packets further comprises duplicating individual ones of said packets having said destination addresses associated with said multicast group.

11. The method of claim 6, wherein said delivery of said composite program content comprises adding said at least portion of said live program to said other programming content not associated to said multicast group, automatically and without substantial intervention.

12. The method of claim 6, wherein said programming content includes news content.

13. An apparatus configured to broadcast composite programming content to one or more client devices, said apparatus comprising:

a first interface configured to receive from a first apparatus first programming content, said first programming content comprising content generated at a first geographic location and configured for broadcast to a first group of subscribers proximate to said first geographic location;

a second interface configured to receive from a second apparatus second programming content, said second programming content comprising content generated at a second geographic location and configured for broadcast to a second group of subscribers proximate to said second geographic location; and a processor configured to join as a member of said second group of subscribers without being proximate to said second geographic location, said group being identified by an Internet Protocol (IP) multicast group address;

wherein said second interface is further configured to receive information objects containing said second programming content from said second apparatus, said second programming content derived at least in part from said information objects, and said information objects being identified by said IP multicast group address; and wherein said processor is further configured to automatically create a composite of said first and said second programming content for broadcast to said one or more client devices of said first group.

14. The apparatus of claim 13, wherein said information objects include IP packets.

15. The apparatus of claim 13, wherein said first and said second groups each comprise a plurality of group members, and at least one source provides a single copy of said programming content to said first and said second group members.

16. The apparatus of claim 13, wherein said programming content includes news content.

17. The method of claim 13, wherein said composite of said first and said second programming content is broadcast to said one or more client devices via transmission thereof over at least a portion of a hybrid fiber coax (HFC) network to one or more set-top terminals.

* * * * *